Oct. 23, 1928.

L. C. COLE

1,688,788

QUARTERING AND CRANK PIN TURNING MACHINE

Filed April 8, 1926

INVENTOR
*L.C.Cole*
BY
*Joseph Schofield*
ATTORNEY

Oct. 23, 1928.  
L. C. COLE  
1,688,788  
QUARTERING AND CRANK PIN TURNING MACHINE  
Filed April 8, 1926   7 Sheets-Sheet 3

Fig. 4.

INVENTOR  
L.C. Cole  
BY Joseph K. Schofield  
ATTORNEY

Oct. 23, 1928.

L. C. COLE 1,688,788

QUARTERING AND CRANK PIN TURNING MACHINE

Filed April 8, 1926  7 Sheets-Sheet 4

INVENTOR
L. C. Cole
BY
ATTORNEY

Oct. 23, 1928.

L. C. COLE 1,688,788

QUARTERING AND CRANK PIN TURNING MACHINE

Filed April 8, 1926     7 Sheets-Sheet 5

Oct. 23, 1928.

L. C. COLE 1,688,788

QUARTERING AND CRANK PIN TURNING MACHINE

Filed April 8, 1926     7 Sheets-Sheet 6

INVENTOR
L. C. Cole
BY
Joseph K. Schofield
ATTORNEY

Oct. 23, 1928.
L. C. COLE
1,688,788

QUARTERING AND CRANK PIN TURNING MACHINE

Filed April 8, 1926    7 Sheets-Sheet 7

INVENTOR
L.C.Cole
BY
Joseph K. Schofield
ATTORNEY

Patented Oct. 23, 1928.

1,688,783

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

QUARTERING AND CRANK-PIN-TURNING MACHINE.

Application filed April 8, 1926. Serial No. 100,674.

This invention relates to a machine adapted to quarter locomotive wheel sets and also to dress off or true worn crank pins in place in the wheels.

More particularly the invention relates to a machine adapted to be arranged either for boring crank pin holes in locomotive wheels when mounted upon their axles; or adapted, with supplemental members positioned on the machine, to dress or true the worn cylindrical surfaces of crank pins while positioned in locomotive wheels mounted upon their axles.

A principal object of the invention is to provide a machine of the above novel type adapted to operate expeditiously to simultaneously bore the holes in locomotive driving wheels for crank pins at the correct angular distance apart and from the wheel axis; or to simultaneously dress the cylindrical surfaces of worn crank pins while in operative position in opposite wheels of a locomotive driving set.

Another object of the invention is to provide an improved supporting means for the mounted wheels on their axles adapted to engage the journal portion of the axle and having an adjustable support or guide for the forward end of the boring tool and also having securing means adapted to engage the wheel and prevent rotation thereof during the boring or turning operations.

Another object of the invention is to provide a supporting and positioning means for a locomotive driving wheel set having a boring bar adjustable along an oblique surface of the headstocks and provided with rotating and advancing means for the bar.

Another object of the invention is to provide a boring bar for a quartering machine having feeding means operative to advance the bar slowly in one direction operated by rotation of the bar and separate means for rapidly traversing the bar in opposite directions.

A still further object of the invention is to provide means for securing a hollow cutter head on one end of the boring bar in place of the boring tool and provide auxiliary adjustable means to support and guide it within a carriage, the supporting means being slidably mounted on a part of a supplemental headstock.

Another object of the invention is to provide adjusting means for the saddle supporting the boring bar and for the auxiliary support for the cutter head which shall be simultaneously operated by a single manually operated lever.

With these and other objects in view, my invention consists in the features of construction and operation set forth in the following specification and illustrated in the accompanying drawings.

In the accompanying drawings annexed hereto and forming a part of this specification, I have shown my invention embodied in a machine adapted to be arranged for quartering and also for crank pin turning operations on locomotive driving sets, but it will be understood that the invention can be otherwise embodied and that the drawings are not to be construed as defining or limiting the scope of the invention, the claims appended to this specification being relied upon for that purpose.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a base; second, oppositely disposed headstocks thereon adapted to support a locomotive driving set between them; third, saddles adjustably mounted on said headstocks; fourth, axially movable boring bars rotatably mounted and axially movable in said saddles; fifth, auxiliary supports for said driving set disposed between said headstocks and adapted to engage the journal surfaces of the axle; sixth, clamping means on the auxiliary supports adapted to hold the wheels from rotative movement during the quartering or turning operation; seventh, guiding means, preferably on the supplemental supports, for the forward ends of the bars; eighth, supplemental headstocks adapted to be interposed on said base between the first mentioned headstocks; ninth, adjustable guides on said supplemental headstocks adapted to be attached to and moved with said saddles; tenth, tool heads on said supplemental headstocks and slidable on said guides; and eleventh, a tool adapted to be attached to said bar and rotatably mounted within said tool head.

Figure 1:
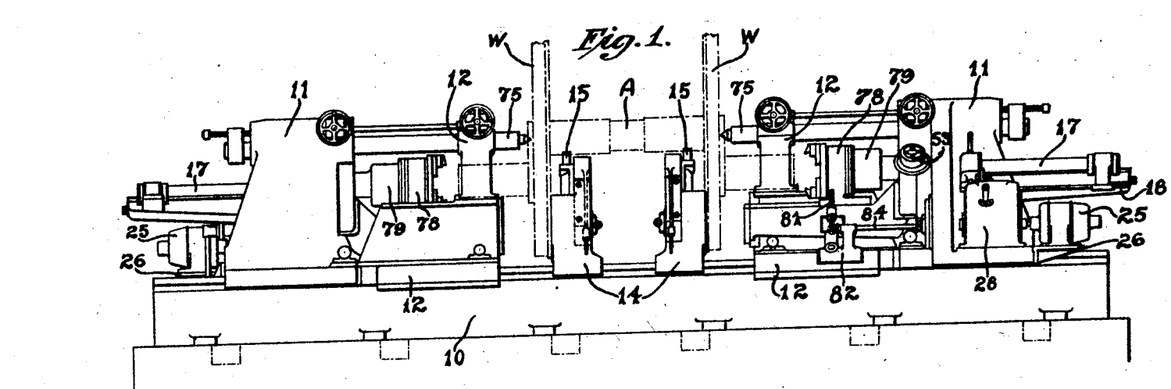
Figure 1 is a front elevation of the complete machine arranged for turning or otherwise operating on worn crank pins.
Figure 2:
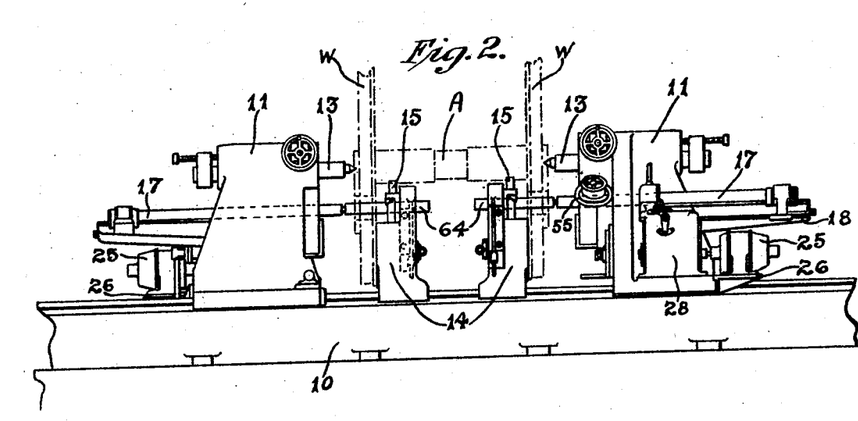
Fig. 2 is a corresponding view of the machine arranged for quartering operations, that is, for boring the holes in the mounted wheels in which are positioned the crank pins.

Referring more in detail to the figures of the drawings, and first to Figs. 1 and 2, it will be seen that the invention comprises a base 10 on which are mounted oppositely disposed headstocks 11. One pair of these headstocks 11 is shown in Fig. 1 with the supplemental headstocks 12 in position between them for operating upon worn crank pins. The headstocks 11 and mechanism thereon shown in Fig. 2 are disposed in position for the boring or quartering operation upon the wheels W of the driving set. First the construction used in the quartering operation will be described.

On the base 10 are mounted the headstocks 11, which as shown in Fig. 2 are disposed oppositely to each other. Each of these headstocks 11 is provided with an axially movable spindle 13 having centers therein adapted to engage within the ends of the axle A forming a part of the driving set being operated on. In order to further support the driving set in its operative position, auxiliary supports 14 are provided on the base 10 disposed between the headstocks 11 and within the driving wheels W of the set. These supplemental supports 14 have vertically adjustable V's 15 engaging the lower portion of the journal surfaces of the axle A on which the wheels W are mounted so that a large portion of the weight of the driving set can be directly supported upon these V's 15. Also provided on these auxiliary supports 14 are clamping means 16 adapted to clamp the wheels W directly against vertical side surfaces of the frame member of the supports 14 so that with the supports 14 secured to the base 10 and with the clamps 16 in clamping position the wheels W will be prevented from rotating during the boring operation. By means of the V's 15, the clamps 16, and the center spindles 13, the wheels are accurately located relative to the axis of spindles 13 and the boring bars 17.

Figures 5, 6:
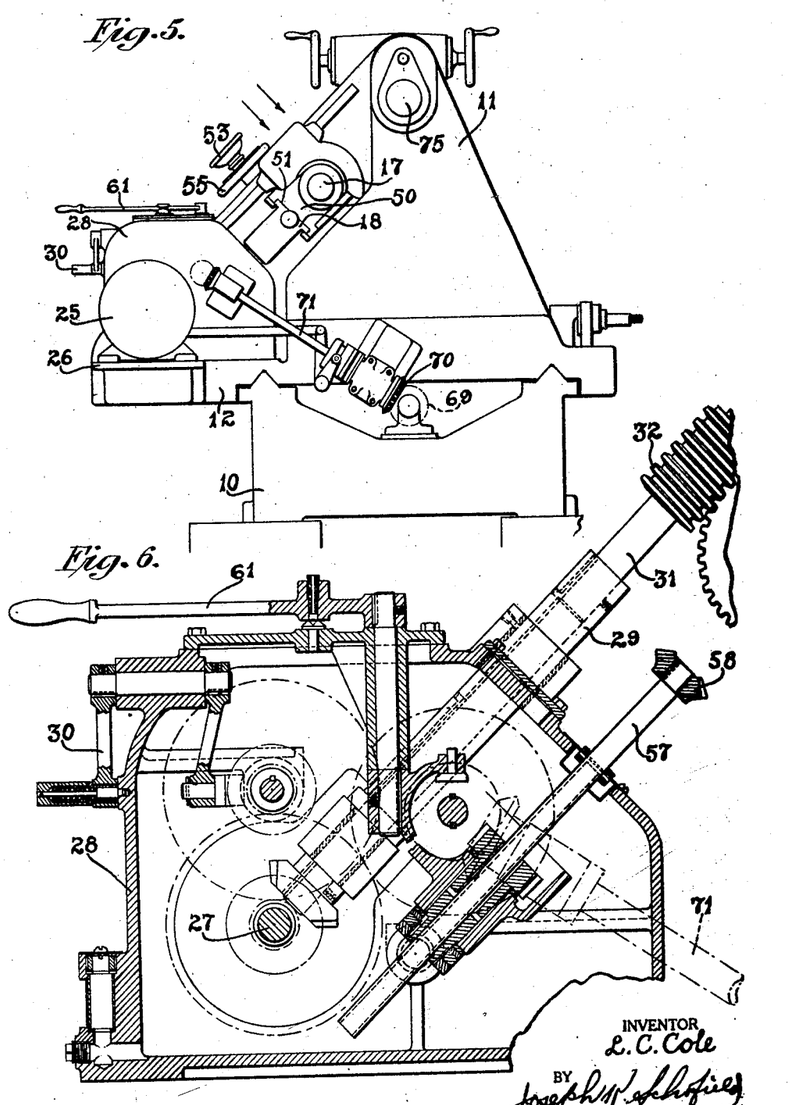
Fig. 5 is an end elevation of the machine taken from the right hand as seen in Figs. 1 and 2.
Fig. 6 is a cross sectional view of the gear box taken on line 6—6 of Fig. 3.

In order to effect the boring of the crank pin holes in predetermined positions in the wheels W, boring bars 17 are provided which are mounted upon obliquely slidable saddles 18 adjustable manually on the headstocks 11 by means of screws 19 toward or from the axis of the center spindles 13. The means to rotate these adjusting screws 19 comprise a ratchet wrench 20 on each headstock 11 mounted on a short horizontal shaft 21 drivingly connected to the shaft having the screw 19 thereon. As shown, this connection is made by means of a pair of bevel gears 22. These boring bars 17 are adapted to be rotated and also simultaneously fed forward relatively to their saddles 18 by driving means mounted on the headstocks 11. For this purpose a motor 25 is mounted upon a bracket 26 outstanding from the headstock 11. This motor 25 drives a shaft 27 within a gear box 28 provided with a plurality of sliding gears on shafts therein for effecting a change of speed of rotation of the shaft 27. As the construction of this feed box 28 may be conventional, it is not thought that a complete description thereof will be necessary. It will suffice to state that an oblique shaft 29 extending outwardly from the gear box 28 is adapted to be rotated at a plurality of different speeds from shaft 27 depending upon the particular operation being performed, these different speeds being obtained by operation of a lever 30 shown clearly in Fig. 6 to connect the particular gears in mesh as required. The oblique driving shaft 29 for rotating the boring bar 17 is provided at its upper end with a telescoping shaft 31 having a worm 32 mounted thereon which is held against endwise movement relative to the saddle 18 between suitable collars 33. This worm 32 is in mesh with a worm wheel 34 splined to the boring bar 17 so that rotation of the worm 32 will positively rotate the bar 17 while permitting it to be advanced axially.

The above described means enable the boring bar 17 to be adjusted to any desired axial and radial position for operation and rotated at any one of a number of different speeds.

Figure 7:
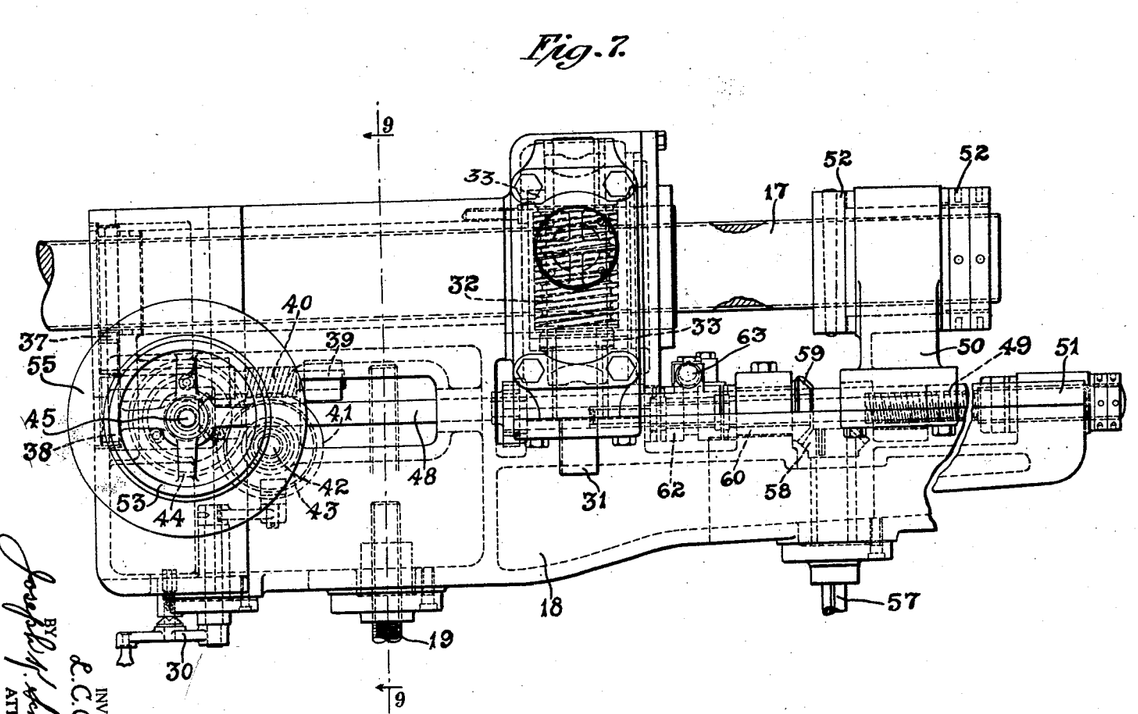
Fig. 7 is a longitudinal view, looking in the direction of the arrows in Fig. 5, of the boring bar together with its adjustable saddle and associated mechanisms.
Figures 8, 9:
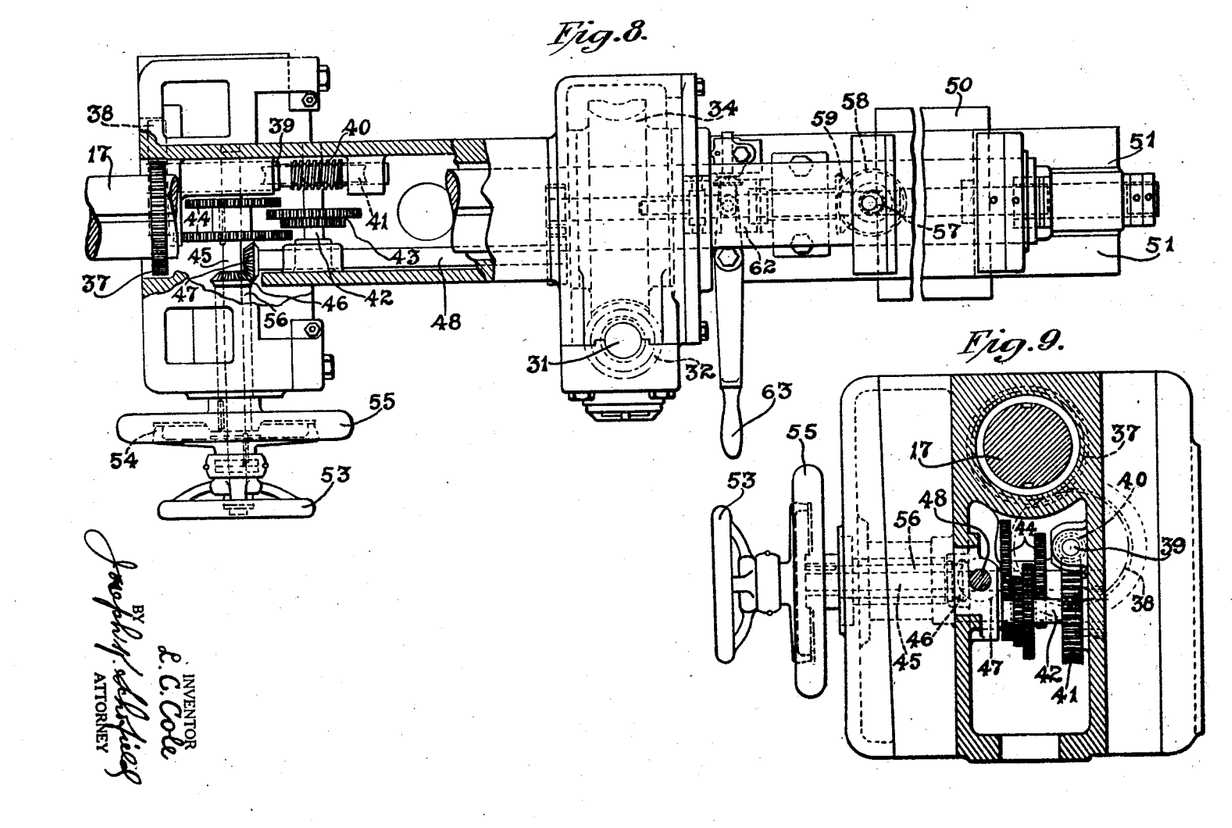
Fig. 8 is another view, partly in section, of the mechanism shown in Fig. 7.
Fig. 9 is a cross sectional view of the bar and feeding mechanism taken on line 9—9 of Fig. 7.
Figure 10:
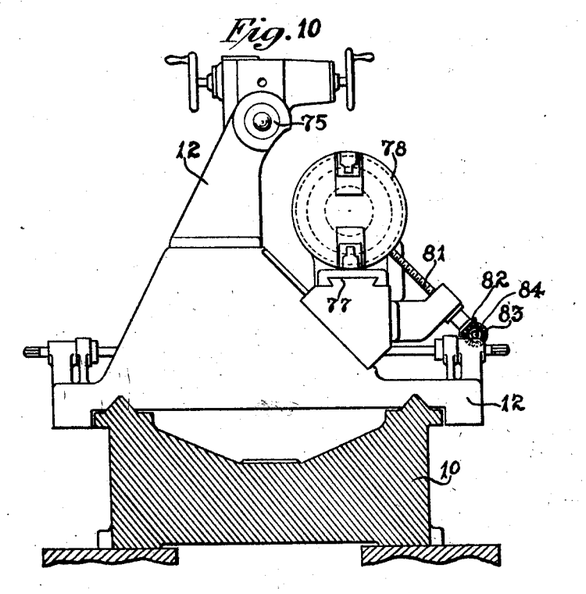
Fig. 10 is a transverse view taken on line 10—10 of Fig. 4.
Figure 11:
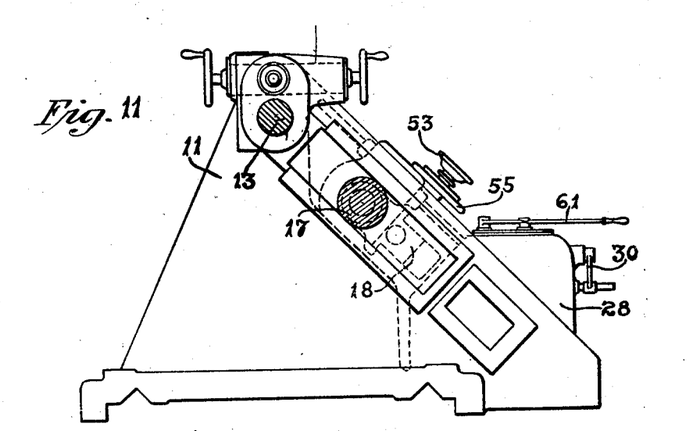
Fig. 11 is a corresponding view taken on line 11—11.

In order to feed the bar 17 forward during operation, a spur gear 37 is splined to the bar 17 but held against endwise movement relative to the saddle 18 so that it is retained in proper position within the supporting saddle. This gear 37 is in mesh with a gear 38 on one end of a shaft 39 housed within the saddle 18 having a worm 40 at its opposite end. This worm 40 is in mesh with a worm wheel 41 on a transverse shaft 42 suitably secured within the supporting saddle 18 and on which are mounted sliding gears 43 splined thereto in the usual manner. These gears 43 are adapted to mesh with one or the other of a pair of gears 44 on a second transverse shaft 45 and are preferably keyed directly thereto. To slide one or the other of these gears 43 into mesh with its mating gear, a lever 36 is provided connected by a shaft and yoke to the gear 43. On this second transverse shaft 45 is a bevel gear 46 in mesh with a corresponding bevel gear 47 on one end of an elongated shaft 48 housed within the saddle 18 and suitably retained against endwise movement. On the opposite end of this shaft 48 are formed screw threads 49 which are adapted to engage screw threads formed in the lower end of a pedestal 50 so that rotation of this shaft 48 obtained by rotation of the boring bar 17 will advance the pedestal 50 along the saddle 18 slowly in one direction. This pedestal 50, as shown in Figs. 7 and 8, is guided upon suitable ways 51 formed in the extension of the supporting saddle 18. Within this pedestal 50 the bar 17 is adapted to rotate freely, suitable collars 52 being provided on the bar 17 preventing endwise movement of the bar 17 relative to the pedestal 50. It will be seen from this construction that as the bar 17 is rotated from the driving connections described above, it will be advanced very slowly in one direction to feed the bar 17 forwardly toward and into the work W. In order to manually adjust or advance the bar 17 relative to its supporting saddle 18 the second transverse shaft 45 is formed at its outer end with a hand wheel 53. A friction clutch 54 on this shaft 45 enables the power means for driving the shaft 48 from shaft 45 to be quickly connected or disconnected. One of the members of the friction clutch carries a hand wheel 55 and is mounted on a sleeve 56 surrounding the shaft 45. The other member of the clutch 54 is keyed to the shaft 45. When the clutch is disengaged the bar 17 can be moved manually in either direction by the hand wheel 55.

To rapidly advance the bar 17 in either direction to adjust the position of the tools preliminary to the cutting operation or to withdraw the bar 17 after the boring operation has been completed, special traversing means are provided for directly rotating shaft 48 and the screw 49, which are driven from a second oblique shaft 57 (see Fig. 7) forming a part of the gear box 28 described above. This second oblique shaft 57 at its upper end is provided with a telescoping portion splined thereto and having a bevel gear 58 at its upper end keyed or otherwise suitably secured thereto. This bevel gear 58 is adapted to mesh with a corresponding bevel gear 59 on a sleeve 60 on the shaft 48 carrying the feeding screw 49. The driving connections for the second oblique shaft 57 are adapted to rotate it in opposite directions and are driven from the shaft 27 in gear box 28, depending upon the position of the controlling lever 61. By these means the bar 17 can be rapidly traversed in either direction. To engage and disengage sleeve 60 with the shaft 48, a toothed clutch 62 surrounding the shaft 48 is provided axially movable by means of a hand lever 63.

Mounted on one end of the bar 17 is a boring tool 64 in the form of a short bar having a cutter 65 mounted transversely therein. The outer or free end of this tool 64 is adapted to engage within a suitable hole within a bracket 66 adjustable upon an oblique surface of the supplemental support 14. With the mechanism arranged as above described, it will be seen that the boring tool 65 can be quickly positioned for engagement with the work W and slowly fed forwardly to suitably bore the driving wheel. During this operation the outer or free end of the tool 64 is suitably supported to maintain the boring tool 65 in correct alignment. Also it will be noted that by adjustment of the supporting saddle 18 and the bracket 66 for the outer end of the boring bar 64, the boring tool 65 can be positioned at any desired distance from the axis of rotation of the wheels W.

It will be understood that the headstock 11 at the opposite end of the base 10 has its boring bar 17 and tool 65 positioned for operating upon the opposite wheel W of the driving set. The mechanisms of each, however are entirely similar and a description of one will therefore suffice. It also will be seen that the boring bar 17 upon one head 11 is upon the front side of the headstock and the boring bar 17 upon the opposite headstock 11 is on the rear side, the angular distance between these two being substantially 90° to conform to standard railroad practice.

Figure 3:
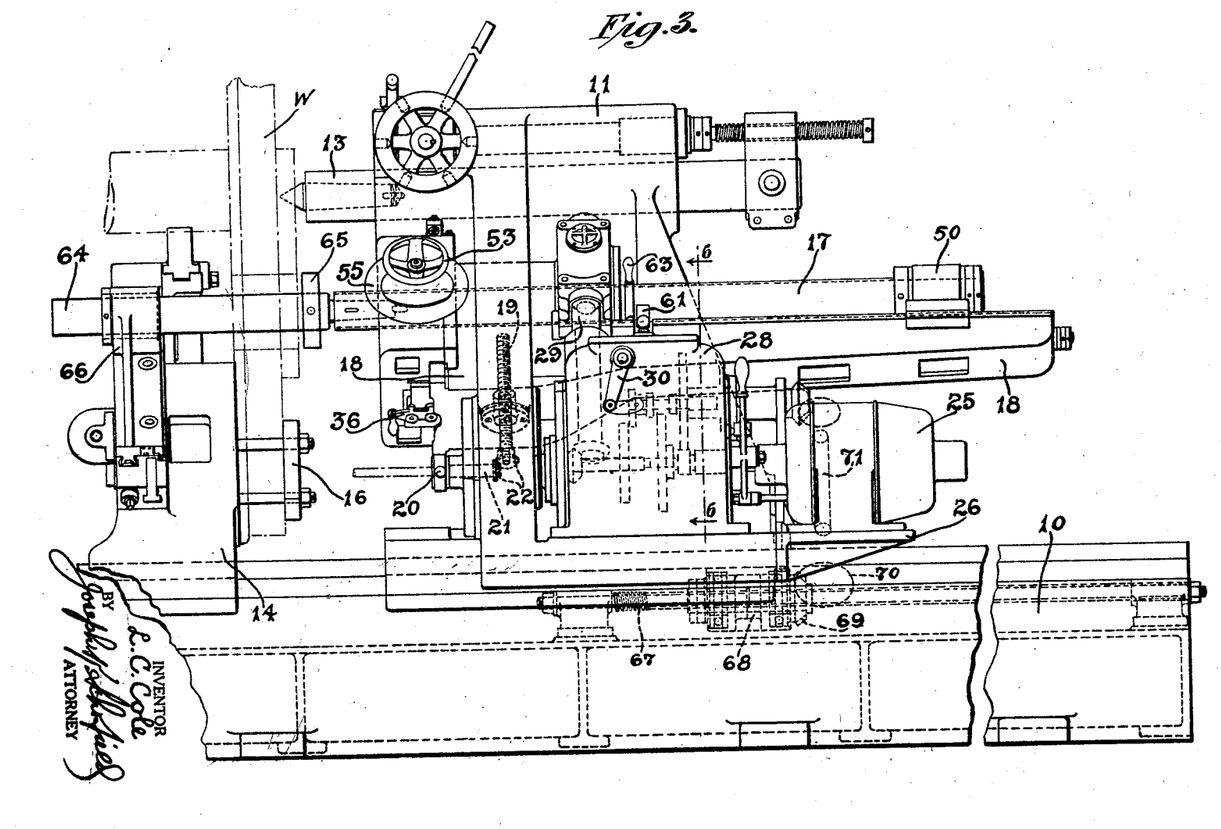
Fig. 3 is an enlarged view in front elevation of one of the headstocks of the machine arranged for the boring or quartering operation.

To adjust the headstocks 11 along the base for the different operations and lengths of axles, a fixed screw 67 is provided below each headstock 11 centrally of the base 10. One of these screws 67 is clearly shown in Fig. 3. Engaging this screw 67 is a nut 68 rotatably mounted within a projection depending from the headstock 11. To rotate this nut 68 it is provided at one end with a bevel gear 69. This gear 69 is in mesh with a corresponding bevel gear 70 on the lower end of an oblique shaft 71 supported rotatably on the headstocks 11. This shaft 71 is most clearly shown in Fig. 5 and is adapted to be rotated in either direction by means of the driving connections within the gear box 28 similarly to shaft 57 from the shaft 27.

Figure 4:
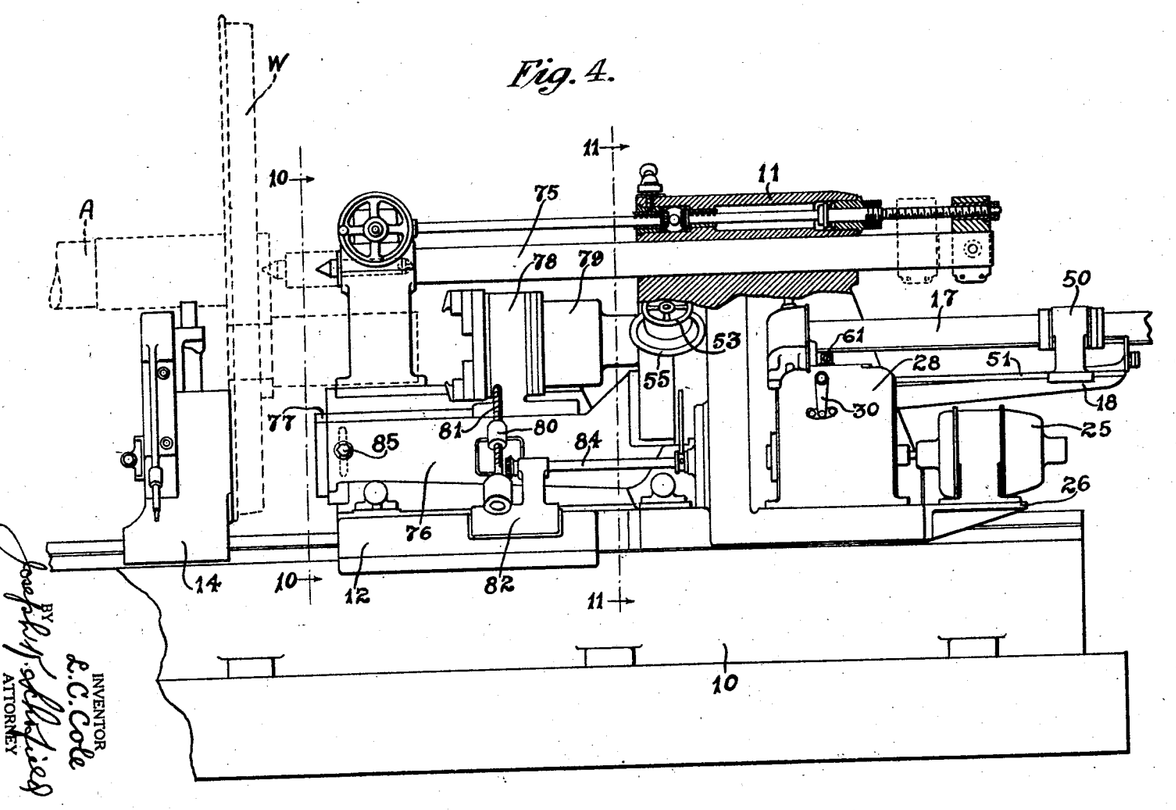
Fig. 4 is a similar enlarged view in front elevation of a headstock arranged for the crank turning operation.

In order to perform turning operations upon crank pins which have become worn and require redressing, the machine is arranged as shown in Fig. 1. The headstocks 11 and the parts thereon are spaced further apart than as shown in Fig. 2 and the boring tools 64 are removed from the boring bars 17. In intermediate positions between the headstocks are positioned the auxiliary headstocks 12 adapted to be clamped directly to the base 10. These auxiliary headstocks 12, as shown in Figs. 1 and 4, are provided with center spindles 75 having centers at their outer ends adapted to engage the recesses in the opposite ends of the axle A. Also the supplemental supports 14 for the wheels W are adapted to engage the journal portions of the axle A in a manner similar to that shown in Fig. 2. Upon one side of the auxiliary headstock 12 is an adjustable guide member 76 having ways 77 extending longitudinally of the machine provided on its upper surface. This guide member 76 is adapted to be secured in position on the auxiliary headstock 12 and also to the movable tool saddle 18 on the headstocks 11 so that it may be adjusted simultaneously with its saddle. Adapted to be slidably mounted upon this guide member 76 is a tool head 78 within which is rotatably mounted a box tool or hollow cutter head 79. This hollow cutter head 79 is mounted upon the forward ends of the boring bars 17. With the hollow cutter head 79 in position it is adapted to be rotated and simultaneously advanced or fed forwardly by the means for advancing the boring bar 17 described above.

The guide member 76 at one end is adapted to be detachably secured to the saddle 18 carrying the boring bar 17 and is adjustable obliquely with the saddle 18. For this purpose a nut 80 is secured to the guide member 76 which is engaged by a screw 81 rotatably mounted and held from endwise movement in a bracket 82 mounted on the auxiliary headstock 12. To rotate this screw 81 simultaneously with the adjusting screw 19 for the saddle 18 means are provided for rotating the screw 81 for the guide member 76 by means of the ratchet wrench or lever 20. A bevel gear 82 is therefore keyed to the screw 81 in mesh with a bevel gear 83 on a horizontal and longitudinal shaft 84 forming an extension to the shaft 21 for adjusting the saddle 18. Operation therefore of the ratchet lever 20 will adjust the saddle 18 and guide member 76 simultaneously in the same direction. Clamping means 85 for the outer or free end of the guide member 76 are provided for securing this member 76 in adjusted position on the auxiliary headstock 12.

What I claim is:

1. A crank pin turning machine comprising in combination, a base, headstocks thereon having tool rotating and feeding means, supplementary headstocks on said base, work centering means on said headstocks, and work centering and adjustable tool guiding means on said supplementary headstocks.

2. A crank pin turning machine comprising in combination, a base, headstocks thereon having tool rotating and feeding means, supplementary headstocks on said base, work supporting means on said headstocks, means to center and support work on said supplementary headstocks and clamp the work in fixed position, and adjustable tool guiding means on said supplementary headstocks.

3. A crank pin turning machine comprising in combination, a base, headstocks thereon having tool rotating and feeding means, a tool supporting saddle adjustable on said headstock, supplementary headstocks on said base, work supporting means on said headstocks, and adjustable tool guiding means on said supplementary headstocks movable with said tool supporting saddle.

4. A crank pin turning machine comprising in combination, a base, headstocks thereon having tool rotating and feeding means, supplementary headstocks on said base disposed between said first mentioned headstocks, work supporting means on said supplementary headstocks, and tool guiding means on said supplementary headstocks.

5. A crank pin turning machine comprising in combination, a base, headstocks thereon having tool rotating and feeding means, supplementary headstocks on said base disposed between said first mentioned headstocks, work supporting means on said supplementary headstocks, brackets on said base for clamping the work in fixed position, and tool guiding means on said supplementary headstocks.

6. A crank pin turning machine comprising in combination, a base, headstocks thereon having tool rotating and feeding means, a tool supporting saddle adjustable on said headstock, supplementary headstocks on said base disposed between said first mentioned headstocks, work supporting means on said supplementary headstocks, and tool guiding means on said supplementary headstocks movable with said tool supporting saddle.

7. A crank pin turning machine comprising in combination, a base, headstocks thereon, saddles adjustably positioned on said headstocks and having tool rotating and feeding means, supplementary headstocks on said base and having work supporting means thereon, tool guiding means adjustably positioned on said supplementary headstocks, and means to detachably attach said guiding means to said saddle.

8. A crank pin turning machine comprising in combination, a base, headstocks thereon, saddles adjustably positioned on said headstocks and having tool rotating and feeding means, supplementary headstocks on said base and having work supporting means thereon, tool guiding means adjustably positioned on said supplementary headstocks, means to detachably attach said guiding means to said saddle, and means to simultaneously adjust said saddles and tool guiding means.

9. A crank pin turning machine comprising in combination, a base, headstocks thereon, saddles adjustably positioned on said headstocks and having tool rotating and feeding means, an axially movable tool in said saddle, supplementary headstocks on said base and having work supporting means thereon, tool guiding means adjustably positioned on said supplementary headstocks, and means to detachably attach said guiding means to said saddle.

10. A quartering and crank pin turning machine for locomotive driving sets comprising in combination, a base, a headstock thereon, a tool saddle adjustably mounted on said headstock, a tool supporting bar rotatably mounted within said saddle, means to rotate said bar, means to feed said bar in one direction from said rotating means, and means to traverse said bar in opposite directions independently of said feeding means.

11. A quartering and crank pin turning machine for locomotive driving sets comprising in combination, a base, means thereon to clamp the work in fixed position, a headstock thereon, work supporting means on said headstock, a tool supporting saddle adjustably mounted on an oblique surface of said headstock, a tool supporting bar rotatably mounted within said saddle, means to rotate said bar, means to feed said bar in one direction from said rotating means, and means to traverse said bar in opposite directions independently of said feeding means.

12. A quartering and crank pin turning machine for locomotive driving sets comprising in combination, a base, a headstock thereon, a saddle adjustably mounted on an oblique surface of said headstock, a tool supporting bar rotatably mounted in said saddle, a tool mounted on one end of said bar, a tool head within which said tool operates, and an adjustable guide for said tool head, said guide being attached to and movable with said saddle.

13. A quartering and crank pin turning machine for locomotive driving sets comprising in combination, a base, a headstock thereon, a saddle adjustably mounted on an oblique surface of said headstock, a tool supporting bar rotatably mounted in said saddle, a tool mounted on one end of said bar, a tool head within which said tool operates, an adjustable guide for said tool head, and means to simultaneously adjust said saddle and guide.

14. A quartering and crank pin turning machine for locomotive driving sets comprising in combination, a base, a headstock thereon, work supporting means on said headstock, a saddle adjustably mounted on an oblique surface of said headstock, a tool supporting bar rotatably mounted in said saddle, a tool mounted on one end of said bar, a tool head within which said tool operates, an adjustable guide for said tool head having ways thereon for said tool head extending parallelly to the bar, and means to axially advance said bar while said bar is rotating.

In testimony whereof, I hereto affix my signature.

LYNDON C. COLE.